Figure 1:
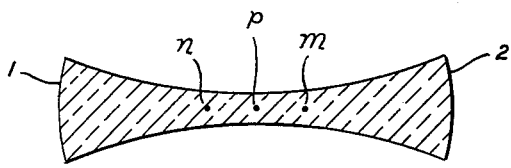

INVENTOR
JOHN R. PIERCE
ATTORNEY

3,137,827
OPTICAL MASER
John R. Pierce, Berkeley Heights, N.J., assignor to Bell Telephone Laboratories, Incorporated, New York, N.Y., a corporation of New York
Filed Sept. 8, 1961, Ser. No. 136,910
7 Claims. (Cl. 331—94.5)

This invention relates to a device for generating or amplifying coherent electromagnetic radiation at high frequencies. Further, it concerns a multimode cavity designed to support radiation in the light frequency range. Such a cavity finds a variety of uses; however, this invention is primarily directed to the cavity as used in a maser oscillator or amplifier.

Maser oscillators and amplifiers have recently been considered in the optical or light frequency range. A current object of concern is obtaining a monochromatic or essentially single-frequency output. This can only be achieved with a cavity designed to be efficiently mode-selective such that essentially one mode is effectively supported in a standing wave, thus producing coherent stimulation of the maser material at a single frequency.

Light frequency radiation is intended to define the electromagnetic band from the farthest infrared to the ultraviolet. This encompasses a general wavelength range of from $2.10^6$ Angstroms to 100 Angstroms.

An optical maser cavity arrangement has been disclosed by Schawlow and Townes in United States Patent No. 2,929,922, issued March 22, 1960. This design is essentially a maser material, commonly referred to as a negative temperature material, bounded by two flat parallel reflecting surfaces. Optical or infrared radiation is retained in such a cavity by multiple reflections between the parallel mirrors, thus permitting sufficient transits through the negative temperature medium to obtain stimulated amplification. The cavity resonant frequency is preferably equal to the resonant frequency of the maser material (that is, the difference in energy levels in the negative temperature medium divided by Planck's constant). This is a well-known requisite for maser action.

A typical three level maser utilizes a material in which the electrons can exist in three or more energy levels. Ordinarily the population in each level is dictated by an equilibrium condition. When such a material is "pumped" with an energy source having a frequency corresponding to the difference between the lowest and highest of the three levels under consideration, then an inverted distribution of excited states may result between two adjacent energy levels. A material existing in this state is termed a negative temperature medium. Such a material can return to its equilibrium energy state with an attendant energy release by two competing mechanisms. The material may decay or relax by a mechanism termed spontaneous emission. Because spontaneous emission is random in nature, it gives rise to unwanted noise. The preferred emission mechanism is stimulated emission which is stimulated by the coherent standing wave in the cavity. This stimulated emission is in phase with the coherent wave and is superimposed thereon, thus amplifying the standing wave. Maser oscillation occurs when the number of excited atoms is sufficiently great that the power of stimulated emission exceeds the power lost from the cavity.

This invention is directed to an improved cavity exhibiting superior qualities over the cavity disclosed in the afore-mentioned U.S. patent which utilizes two parallel flat reflecting surfaces. The cavity of the present invention employs two spaced reflectors wherein at least one of the reflectors is concave, the degree of curvature bearing a critical relation to the spacing of the reflection surfaces. This prescribed geometry provides a highly mode selective cavity by effective cavity by effecting the maximum separation between modes. It additionally results in a cavity of lower loss while reducing the requisite size of the reflecting surfaces. Various other advantages will become apparent.

It has been found that cavities designed to compress the electromagnetic field patterns into a small cross-sectional wave front encourage significant variations in phase velocity of the various mode patterns constituting the front. The consequence of this is a greater separation between competing optical modes thereby enabling a greater degree of mode selectivity. The optimum degree of mode separation is derived according to the following:

Consider Maxwell's equations in Cartesian coordinates. Let V be any Cartesian component of E (electric field) or H (magnetic field). Then:

$$\frac{\partial^2 V}{\partial z^2} = -\left(\beta_0^2 + \frac{\partial^2 V/\partial x^2}{V} + \frac{\partial^2 V/\partial y^2}{V}\right)V \quad (1)$$

$$\beta_0^2 = \omega^2 \mu \epsilon \quad (2)$$

where $\beta_0$ is the phase constant for a plane electromagnetic wave, $\omega$ is the angular frequency, $\mu$ is the permitivity of a vacuum and $\epsilon$ is the dielectric constant.

Of principal interest are solutions of a wave nature for which quantities vary with z approximately as exp. $(-\Gamma z)$, the propagation constant $\Gamma$ varies slowly with distance, and $\Gamma$ differs little from $j\beta_0$. Accordingly, as a suitable approximation the differentiation is replaced with respect to z by multiplication by $-\Gamma$. Solving Equation 1 for $\beta$, assuming that the other terms on the right are small compared with $\beta_0^2$ and retaining the first two terms of the expansion of the square root, the following is obtained:

$$-\Gamma = -j\beta_0\left(1 + \frac{\partial^2 V/\partial x^2 + \partial^2 V/\partial y^2}{2\beta_0^2 V}\right) \quad (3)$$

Considering the z-axis normal to a phase front, the magnitude of V along the phase front will change, but not the phase. Let $dV/dy$ and $d^2V/dy^2$ be total derivatives moving along the phase front. Then:

$$\frac{\partial^2 V}{\partial y^2} = \frac{d^2 V}{dy^2} - 2\frac{dz}{dy}\frac{\partial}{\partial z}\left(\frac{dV}{dy} - \frac{\partial V}{\partial z}\frac{dz}{dy}\right)$$

$$-\left(\frac{dz}{dy}\right)^2\frac{\partial^2 V}{\partial z^2} - \frac{d^2 z}{dy^2}\frac{\partial V}{\partial z} \quad (4)$$

Let C be the curvature of the phase front in the $y$—$z$ plane. Then near the axis $$\frac{dz}{dy} = Cy \quad (5)$$

$$\frac{d^2 z}{dy^2} = C \quad (6)$$

Because $-\Gamma$ is very nearly equal to $-j\beta_0$ in (4), the partial differentiation can be replaced with respect to z by multiplication by $-j\beta_0$. This taken with Equations 5 and 6 yields $$\frac{\partial^2 V}{\partial y_2} = \frac{d^2 V}{dy^2} - \beta_0^2 y^2 C^2 V$$

$$+ j\beta_0 C\left(2y\frac{dV}{dy} + V\right) \quad (7)$$

This same procedure can be used with respect to $\partial^2 V/\partial x^2$. Assume that the curvature of the phase front in the $x$—$z$ plane is also C. The result obtained together with (7) in (3), gives:

$$-\Gamma = -j\beta_0\left(1 - \frac{1}{2}C^2(x^2 + y^2) + \frac{d^2V/dx^2 + d^2V/dy^2}{2\beta_0^2 V}\right)$$

$$+ C\left(1 + \frac{2(y\,dV/dy + x\,dV/dx)}{V}\right) \quad (8)$$

The real term on the right of (8) describes an increase or decrease of field strength with distance. Near the axis, where the term involving $y$ is negligible, it is just what would be expected because of the convergence of a wave of curvature C, assuming the power density to be proportional to $VV^*$ (where $V^*$ is the conjugate of $V$) and the power to flow normal to the phase front.

Equation 8, or a generalization of it in which the curvatures in the $x$—$z$ and $y$—$z$ planes are different, could be used for a variety of purposes; for instance, for obtaining fields near an antenna or in a tapering waveguide. Here it is used for studying the propagation of optical radiation in a supporting cavity. For electromagnetic radiation having curved phase fronts:

$$V = H_n(x/a(H_m(y/a)e^{-\frac{1}{2}(x^2+y^2)/a^2} \quad (9)$$

Here $H_n$ and $H_m$ are Hermite polynomials of degrees $n$ and $m$, and $a$ is the radius of the field pattern.

Taking $x$ and $y$ in Equation 9 as measured along the phase front:

$$\frac{d^2V/dx^2 + d^2V/dy^2}{V} = -\frac{2(n+m+1)}{a^2} + \frac{r^2}{a^4} \quad (10)$$

$$r^2 + x^2 + y^2 \quad (11)$$

It has already been noted that the attenuation term in Equation 8 merely implies power flow normal to the phase front. Henceforward this term will be disregarded. Solving for the phase constant $\beta$ $$\beta = \beta_0 \left(1 - \frac{(n+m+1)}{\beta_0^2 a^2} + \frac{r^2}{2\beta_0^2 a^4} - \frac{C^2 r^2}{2}\right) \quad (12)$$

It is seen that the phase constant varies with $r$. If this were not so, the curvature of the phase front would be constant. In the vicinity of the axis:

$$\frac{dC}{dz} = -\frac{1}{\beta_0^2 a^4} + C^2 \quad (13)$$

Noting that as $a$ approaches infinity (so that we are dealing with essentially rectilinear propagation) Equation 13 yields:

$$\frac{1}{C} = -z + \text{const.}$$

This is the case of a spherical wave converging toward or diverging from a point.

In terms of a ray normal to the phase front, a ray defined by $r$ as a function of $z$, $$C = -\frac{1}{r}\frac{dr}{dz} \quad (14)$$

As the field contracts or expands, the power will flow along contracting or expanding channels between such rays, and the scale of the field will decrease or increase. Thus, $a$ in Equation 13 is regarded as the variable $r$, so that Equations 13 and 14 yield the following differential equation for $r$:

$$\frac{d^2r}{dz^2} = \frac{1}{\beta_0^2 r^3} \quad (15)$$

Integrating for $z=0$, $r=a_0$ and $dr/dz=0$, then:

$$r = a_0 \left(1 + \frac{z^2}{\beta_0^2 a_0^4}\right)^{\frac{1}{2}} \quad (16)$$

$$C = \frac{-z}{\beta_0^2 a_0^4 + z^2} \quad (17)$$

If the reflectors are to reverse the curvature of the phase front at a distance $S/2$ from the midpoint between the mirrors, the convergence $C_L$ of the reflectors must be given by:

$$C_L = \frac{2S}{\beta_0^2 a_0^4 + S^2/4} \quad (18)$$

It is useful to express $r/a_0$ and $r$ at the mirror in terms of the physical parameter $C_L S$. We obtain:

$$r/a_0 = (1 - C_L S/4)^{-\frac{1}{2}} \quad (19)$$

$$r = (S/2\beta_0)^{\frac{1}{2}}(C_L S/4)^{-\frac{1}{4}}(1 - C_L S/4)^{-\frac{1}{4}} \quad (20)$$

The cavity will maintain a narrow beam of coherent light. If this is displaced from the axis it will behave much like a ray in geometrical optics. In order for a perturbed ray to be stable in such a cavity:

$$C_L S > 4 \quad (21)$$

It is seen from Equations 19 and 20 that $r/a_0$ and $r$ both approach infinity as $C_L S$ approaches 4. The values of $C_L S$ that result in confined modes range from 0 to 4, and all of these satisfy Equation 21, the condition for lateral stability of the beam.

Examining the phase constant on the axis, if we substitute $r$ as given by Equation 16 for $a$ in Equation 12 and use Equation 18 to express $\beta_0^2 a_0^4$ in terms of $C_L S$, we obtain:

$$\beta = \beta_0 - \frac{2(n+m+1)S\sqrt{(4/C_L S) - 1}}{((4/C_L S) - 1)S^2 + 4z^2} \quad (22)$$

In Equation 22, $\beta_0$ is the only quantity on the right that varies with frequency. Hence, the group velocity of every mode is equal to the velocity of light at all positions along the axis.

Integrating (22) from $z=-S/2$ to $z=S/2$ gives the total phase shift $\theta$ between lenses.

$$\theta = \beta_0 S + 2(n+m+1) \, \text{ctn}^{-1} \sqrt{(4/C_L S) - 1} \quad (23)$$

As pointed out in connection with Equations 21 to 23 the mode separation improves as $C_L S$ approaches 4. However, this phenomenon is defeated if the product $C_L S$ reaches or exceeds 4. Thus, to achieve the purposes of this invention, the product $C_L S$ should be less than four and, in order to assure a significant degree of mode separation, should have a value in excess of 3 and preferably in excess of 3.6.

Since $$C_L = \frac{2}{R}$$

where R is the radius of curvature of the reflector, the reflector separation, S, in terms of R is given by:

$$2R > S > 1.5R \quad (24)$$

or preferably $$2R > S > 1.8R \quad (24a)$$

Note that the variation of $\theta$ with mode number increases as $C_L S$ approaches 4. Hence, the modes of a maser will become more widely separated as $C_L S$ approaches 4.

The above considerations deal with a symmetrical cavity, i.e., one utilizing two spherical reflectors of equal radii. However, reflectors of unequal radii of curvature are equally effective for the purposes of this invention.

Let $R_1$ and $R_2$ be the radii of curvature of the two reflectors and $L_1$ and $L_2$ be the distance each respective reflector is spaced from a common reference point, the point where the beam is narrowest (i.e., where $r$ is a minimum).

Assuming $R_2 > R_1$ the correct value of $L_1$ is determined from:

$$R_1 > L_1 > .75R_1 \quad (25)$$

and preferably $$R_1 > L_1 > .9R_1 \quad (25a)$$

which are derived from Equations 24 and 24a wherein only half the cavity is considered.

Having obtained $R_1$ and $L_1$ the values of $R_2$ and $L_2$ can be obtained from Equations 16 and 17 which yield:

$$R^2 = \frac{R_1 L_1 - L_1^2 + L_2^2}{L^2} \quad (26)$$

where $S$ (total spacing) $= L_1 + L_2$ and either $R_2$ or $L_2$ is given.

The extreme case for cavities having reflectors of unequal radii of curvature is where $R_2=\infty$ and $L_2=0$. Thus, a flat planar reflector spaced from a concave reflector at a distance $L_1$ as determined from Equations 25 and 25a becomes the optical equivalent of the symmetrical cavity utilizing two concave reflectors of equal radii of curvature.

While the foregoing discussion has consistently referred to spherical reflectors, other curved surfaces such as paraboloidal reflectors, are appropriate to obtain the advantages of this invention. However, in view of the relative difficulty in manufacturing such complex surfaces, spherical mirrors are preferred. Furthermore, paraboloidal reflectors possess axes and, therefore, lose the advantage of ease of alignment.

Figure 2:
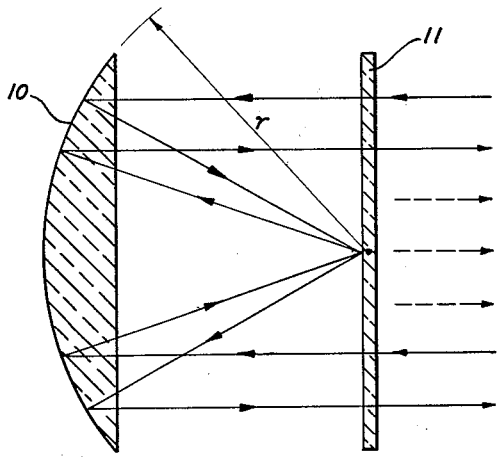

For a more thorough understanding of the foregoing discussion and the specific embodiments described hereinafter, reference is made to the drawing in which:

FIG. 1 is a schematic diagram illustrating a desirable energy distribution for light reflected in a cavity constructed with spherical reflectors according to this invention; and FIG. 2 is a schematic front elevation view of a preferred cavity geometry according to this invention showing by ray optics the emerging light beam.

In FIG. 1 reflectors 1 and 2 are spaced at a distance of 1.9 times their common radius. Point $m$ represents the center of curvature for reflector 1 and $n$ the respective point for reflector 2. The schematic energy distribution reflects a "pinch" effect at $p$ which imposes a significant variation in phase velocity of the various wave fronts passing that point.

FIG. 2 shows a preferred embodiment of this invention. According to this embodiment, concave reflector 10 is used in combination with a flat, planar reflector. In this case $R_2=\infty$ and the reflector 11 is placed at distance $L_1$ from the concave reflector. Flat, planar reflector 11 preferably allows greater transmission than concave reflector 10 so the concave reflector should be as nearly perfect a reflector as possible. This allows most of the maser output to emerge through the flat reflector, thus eliminating the bending of the light rays by a curved dielectric interface.

The cavity of this invention may be used in conjunction with any known negative temperature materials. A gas emission medium may be employed, such as the potassium vapor of United States Patent 2,929,922 or, for a solid state device, ruby is appropriate. Vapors of the alkali metals and various rare earth salts such as europium chloride or samarium chloride may be used. The pump energy may be any high frequency energy source having a wavelength approximately equal to that of the pump transition.

The nature of the reflecting surfaces is not a critical feature of this invention. The reflectors may be mirrors of vapor-deposited metallic films. In the interest of obtaining high reflectivity and thus providing greater cavity efficiency, multiple dielectric layer reflectors, which may provide for reflection coefficients in excess of .95 and preferably in excess of .98 are preferred. The coherent light generated or amplified in the cavity is transmitted through the reflectors. Typically such reflectors are designed to transmit approximately one percent of the incident light. Alternatively the output power can be obtained from the side as diffraction losses.

Various other arrangements and modifications will be apparent to those skilled in the art and are still considered as within the scope of this invention.

What is claimed is:

1. An optical maser comprising two spaced apart reflectors at least one of which is concave and at least one of which possesses a reflection coefficient of less than unity to permit the obtaining of coherent radiation from the cavity defined by said reflectors, said reflectors aligned facing one another and spaced apart by a distance given by the relation:

$$S=L_1+L_2$$

where S is the spacing, and $L_1$ and $L_2$ are the distances each respective reflector is spaced from a common reference point, $$R_1>L_1>.75R_1$$

and $L_2$ is obtained from:

$$R^2=\frac{R_1L_1-L_1^2+L_2^2}{L_2}$$

where $R_1$ and $R_2$ are the radii of curvature of each reflector, respectively, and all quantities are in equal units of length a negative temperature medium disposed between said reflectors and means for pumping the negative temperature medium to establish a negative temperature condition.

2. The device of claim 1 where $$R_1>L_1>.9R_1$$

3. The device of claim 1 wherein each reflector is concave and both reflectors have the same radius of curvature, R, the reflectors further being spaced apart by a distance prescribed by the range 1.5R to 2R.

4. The device of claim 3 wherein the prescribed range is 1.8R to 2R.

5. The device of claim 1 wherein one reflector is planar and the distance separating the reflectors is represented by:

$$R_1>S>.75R_1$$

where $R_1$ is the radius of curvature of the concave reflector.

6. The device of claim 5 wherein the distance separating the reflectors is represented by:

$$R_1>S>.9R_1$$

where $R_1$ is the radius of curvature of the concave reflector.

7. The device of claim 5 wherein the flat reflector has a higher transmission coefficient than the concave reflector.

References Cited in the file of this patent

UNITED STATES PATENTS 3,055,257 Boyd et al. _____ Sept. 25, 1962

UNITED STATES PATENT OFFICE
CERTIFICATE OF CORRECTION

Patent No. 3,137,827  June 16, 1964

John R. Pierce

It is hereby certified that error appears in the above numbered patent requiring correction and that the said Letters Patent should read as corrected below.

Column 4, lines 70 to 72, equation (26) should appear as shown below instead of as in the patent:

$$R_2 = \frac{R_1 L_1 - L_1^2 + L_2^2}{L_2}$$

column 6, lines 24 to 26, the equation should read as shown below instead of as in the patent:

$$R_2 = \frac{R_1 L_1 - L_1^2 + L_2^2}{L_2}$$

Signed and sealed this 20th day of October 1964.

(SEAL)
Attest:

ERNEST W. SWIDER
Attesting Officer

EDWARD J. BRENNER
Commissioner of Patents